US012000159B2

(12) United States Patent
Li

(10) Patent No.: US 12,000,159 B2
(45) Date of Patent: Jun. 4, 2024

(54) CERAMIC TILE LEVELING BRACKET, PUSHING AND CLAMPING PLIERS AND CERAMIC TILE LEVELING AND LAYING SYSTEM

(71) Applicant: HANGZHOU GREAT STAR INDUSTRIAL CO., LTD., Hangzhou (CN)

(72) Inventor: Yueming Li, Hangzhou (CN)

(73) Assignee: Hangzhou Great Star Industrial Co., Ltd., Hangzhou (CN)

( * ) Notice: Subject to any disclaimer, the term of this patent is extended or adjusted under 35 U.S.C. 154(b) by 0 days.

(21) Appl. No.: 17/237,937

(22) Filed: Apr. 22, 2021

(65) Prior Publication Data

US 2021/0238869 A1 Aug. 5, 2021

Related U.S. Application Data

(62) Division of application No. 16/470,512, filed as application No. PCT/CN2017/096189 on Aug. 7, 2017, now Pat. No. 10,988,944.

(30) Foreign Application Priority Data

Dec. 18, 2016 (CN) ......................... 201621388937.1

(51) Int. Cl.

*E04F 21/18* (2006.01)
*B25B 7/22* (2006.01)
*E04F 21/22* (2006.01)

(52) U.S. Cl.

CPC ............ *E04F 21/1877* (2013.01); *B25B 7/22* (2013.01); *E04F 21/22* (2013.01)

(58) Field of Classification Search

CPC . E04F 21/00; E04F 13/08; E04F 21/22; E04F 15/02; E04F 21/18; E04F 21/1877;
(Continued)

(56) References Cited

U.S. PATENT DOCUMENTS 4,149,435 A * 4/1979 Smith ....................... B25B 7/02 81/426
5,022,292 A 6/1991 Hammer et al.
(Continued)

FOREIGN PATENT DOCUMENTS

CN 203769274 U 8/2014
CN 203856178 U 10/2014
(Continued)

*Primary Examiner* — Andrew J Triggs
(74) *Attorney, Agent, or Firm* — William W. Cochran; Cochran Freund & Young LLC

(57) ABSTRACT

Disclosed are a ceramic tile leveling bracket, pushing and clamping pliers and a ceramic tile leveling and laying system. The ceramic tile leveling and laying system comprises: a ceramic tile leveling bracket (1), an insertion block (2) and pushing and clamping pliers (3), wherein the ceramic tile leveling bracket (1) is provided at the junction between two adjacent ceramic tiles (4), one end of the insertion block (2) is inserted into an insertion block through hole (16) of the ceramic tile leveling bracket (1), and the pushing and clamping pliers (3) push and clamp the insertion block (2) into the insertion block through hole (16), so that an insertion block bottom surface (21) is tangent to upper surfaces of the two ceramic tiles (4). The ceramic tile leveling and laying system is easy to operate, and helps to improve the laying efficiency and laying quality.

17 Claims, 8 Drawing Sheets

(58) Field of Classification Search
CPC .... B25B 7/22; B25B 7/00; B25B 7/02; B25B 7/14
See application file for complete search history.

(56) References Cited

U.S. PATENT DOCUMENTS

| | | | | |
|---|---|---|---|---|
| 7,992,354 | B2 * | 8/2011 | Doda, Jr. | E04F 13/0892 52/749.11 |
| 9,260,872 | B2 * | 2/2016 | Bunch | E04F 21/0092 |
| 9,447,590 | B2 * | 9/2016 | Sighinolfi | E04F 21/18 |
| 9,487,959 | B2 * | 11/2016 | Bunch | E04F 21/1844 |
| 9,562,365 | B2 ‡ | 2/2017 | Bucsa | E04F 21/0092 |
| 10,988,944 | B2 * | 4/2021 | Li | E04F 21/22 |
| 2008/0236094 | A1 ‡ | 10/2008 | Doda | E04F 21/22 52/749.11 |
| 2008/0236344 | A1 * | 10/2008 | Chiang | B25B 7/22 81/368 |
| 2009/0211034 | A1 | 8/2009 | Lionel | |
| 2015/0308130 | A1 | 10/2015 | Biee | |
| 2019/0309531 | A1 ‡ | 10/2019 | Li | E04F 21/18 |
| 2021/0238869 | A1 * | 8/2021 | Li | B25B 7/22 |

FOREIGN PATENT DOCUMENTS

| | | | |
|---|---|---|---|
| CN | 204456801 | U | 7/2015 |
| CN | 204983579 | U | 1/2016 |
| CN | 205713011 | U | 11/2016 |
| EP | 2514886 | A1 ‡ | 10/2012 |
| EP | 2514886 | A1 | 10/2012 |
| WO | 2008118418 | A1 | 10/2008 |
| WO | 2015161366 | A1 | 10/2015 |

* cited by examiner
‡ imported from a related application

CERAMIC TILE LEVELING BRACKET, PUSHING AND CLAMPING PLIERS AND CERAMIC TILE LEVELING AND LAYING SYSTEM

TECHNICAL FIELD

The present invention relates to a ceramic tile laying tool, in particular to a ceramic tile leveling bracket, pushing and clamping pliers and a ceramic tile leveling and laying system.

BACKGROUND ART

Ceramic tile inlaying processes often used in the building decoration industry mainly use the traditional manual paving method. The common method for paving floor ceramic tiles is generally divided into a dry laying method and a wet laying method.

The wet laying method uses cement mortar or the like as an adhesive to directly paste the ceramic tile to a wall or a floor. The shortcomings lie in that the flatness and fullness of the paved ceramic tile are relatively poor, and the viscosity thereof is also poor, so that it can only be applied to the pasting of small ceramic tiles, and has a large limitation; and, the workload in the pasting process is relatively large, the technical requirements for the construction personnel are high, and the construction efficiency is low.

The dry laying method directly lays ceramic tiles of a larger size and area, such as floor tiles, on a flat and dried floor. The shortcomings lie in that the thickness of the required laying materials is relatively great, the requirements for the floor flatness are higher, it is necessary to use a sufficient amount of cement to level the entire floor, which requires a high technical level for the construction personnel and the phenomenon of waste of materials is more serious, and if the flatness is not enough, it is easy to produce a hollowing phenomenon, which affects the quality of the laying; and it is necessary to wait for the cement to solidify and dry before starting to lay the ceramic tile, and the ceramic tile further needs to be tamped with a rubber hammer after laying, so tat the process is complicated, the workload is large, the laying speed is slow, and the construction efficiency is low.

There is a need in the market for a device capable of assist in ceramic tile laying, which can quickly achieve ceramic tile leveling and improve the construction efficiency.

SUMMARY OF THE INVENTION

An object of the present invention is to provide a ceramic tile leveling and laying device, which solves the problems of the prior art, such as complicated leveling and laying processes, low laying efficiency, and high technical requirements for operators.

In order to solve the above technical problems, the present invention provides a ceramic tile leveling and laying system, comprising: a ceramic tile leveling bracket, which is disposed at the junction between two adjacent ceramic tiles; an insertion block having one end inserted into an insertion block through hole of the ceramic tile leveling bracket; and the pushing and clamping pliers for pushing and clamping the insertion block to the insertion block through hole such that an insertion block bottom surface is tangent to upper surfaces of the two ceramic tiles.

In order to solve the above technical problems, the present invention also provides a ceramic tile leveling bracket, comprising: a pad for supporting bottom surfaces of two adjacent ceramic tiles; an insert protruding from a center line of an upper surface of the pad, for being inserted into a gap between the two adjacent ceramic tiles; and a breakable sheet located at a lower portion of the insert and adjacent to the pad; wherein the insert comprises: an insertion block through hole which penetrates the insert and into which an insertion block is inserted; and/or a bayonet disposed on a side edge of the insert on one or either side, and having a height greater than the height of the sheet.

Further, in various embodiments, the insert further comprises a hook-shaped engagement block disposed on a side edge of the insert on one or either side and protruding toward the bayonet; wherein the bottom of the bayonet is arc-shaped, and a portion of the bayonet that is close to the hook-shaped engagement block forms a hook-shaped bayonet portion.

Further, in various embodiments, the insert comprises a linear groove recessed from a surface of the insert on one or either side, the bottom of the linear groove being the sheet.

Further, in various embodiments, a bottom surface of the pad is an arc-shaped surface, which is part of a cylindrical side surface; and two ends of the pad extend upward from the middle of the bottom surface to make contact with the bottom surfaces of the ceramic tiles.

Further, in various embodiments, the pad comprises: reinforcing ribs disposed at the tops of the two ends of the pad; and/or a pad through hole which penetrates the pad.

Further, in various embodiments, the longitudinal section of the insertion block is wedge-shaped, which comprises: an insertion block bottom surface, which is a plane; an insertion block top surface, which is an inclined plane and forms an acute angle with the insertion block bottom surface; and two or more serrations protruding from the insertion block top surface and arranged in the same straight line, wherein each serration comprises a vertical serration surface and an inclined serration surface, and the vertical serration surface is perpendicular to the insertion block bottom surface.

In order to solve the technical problem of inserting and clamping the insertion block to the insertion block through hole, the present invention also provides pushing and clamping pliers, comprising: a first component, comprising a first clamping portion and a first handheld portion; a second component, comprising a second clamping portion and a second handheld portion; and a pivot via which the second clamping portion is rotatably connected to the first clamping portion; a first clamping block disposed at a top end of the first clamping portion; a second clamping block disposed at a top end of the second clamping portion and arranged opposite the first clamping block; a clamping groove recessed from an inner side wall of the first clamping block, with the direction of an opening of the groove facing the second clamping block; and a clamping through groove penetrating through the second clamping block and disposed opposite the clamping groove.

Further, in various embodiments, the pushing and clamping pliers further comprise a withdraw device for damaging the sheet of the ceramic tile leveling bracket to remove the portion of the insert above the sheet.

Further, in various embodiments, the withdraw device comprises: a hook angled portion protruding in a barb shape from an outer side wall of the first clamping block; and a rounded portion disposed at a joint between a side wall and the top of the second clamping block; or, the withdraw device comprises: a hook angled portion protruding in a barb shape from an outer side wall of the second clamping block;

and a rounded portion disposed at a joint between a side wall and the top of the first clamping block.

Further, in various embodiments, the pushing and clamping pliers further comprise clamping teeth disposed on an inner side face of the first clamping block and disposed opposite the second clamping block, and/or disposed on an inner side face of the second clamping block and disposed opposite the first clamping block.

Further, in various embodiments, the pushing and clamping pliers further comprise an elastic member having one end connected to the first clamping portion and the other end connected to the second clamping portion, or having one end connected to the first handheld portion and the other end connected to the second handheld portion.

Further, in various embodiments, the pushing and clamping pliers further comprise: a first guiding post protruding from a side face of the first clamping portion; and a second guiding post protruding from a side face of the second clamping portion and disposed opposite the first guiding post; wherein the elastic member is a coil spring, which has one end sheathed on the first guiding post, and the other end sheathed on the second guiding post.

Further, in various embodiments, the pushing and clamping pliers further comprise: a first guiding post protruding from a side face of the first handheld portion; and a second guiding post protruding from a side face of the second handheld portion and disposed opposite the first guiding post; wherein the elastic member is a coil spring, which has one end sheathed on the first guiding post, and the other end sheathed on the second guiding post.

Further, in various embodiments, the pushing and clamping pliers further comprise a locking device for switching the pushing and clamping pliers between opened and closed states, wherein when the locking device is locked, the pushing and clamping pliers are in the closed state; and when the locking device is unlocked, the pushing and clamping pliers are in the opened state.

Further, in various embodiments, the pushing and clamping pliers further comprise: a first bent portion, which is part of the first clamping portion and is sheathed outside the pivot; and a second bent portion, which is part of the second clamping portion and is sheathed outside the pivot.

Further, in various embodiments, the locking device comprises: a locking groove disposed on an outer side wall of the first bent portion; a locking member rotatably fitted to a surface of the end of the second clamping portion and disposed opposite the locking groove; and a blocking block disposed on a surface of the end of the first clamping portion and disposed opposite the second bent portion, wherein the blocking block comes into contact with an outer side wall of the second bent portion when the opening angle of the pushing and clamping pliers is at the maximum.

Further, in various embodiments, the locking device comprises: a locking groove disposed on an outer side wall of the second bent portion; a locking member rotatably fitted to a surface of the end of the first clamping portion and disposed opposite the locking groove; and a blocking block disposed on a surface of the end of the second clamping portion and disposed opposite the first bent portion, wherein the blocking block comes into contact with an outer side wall of the first bent portion when the opening angle of the pushing and clamping pliers is at the maximum.

Further, in various embodiments, the locking member comprises: a locking member body rotatably connected to the end of the first clamping portion or the second clamping portion via a second pivot; a locking engagement block protruding from a surface of the locking member body; and a tab protruding from the surface of the locking member body to drive the locking member body to rotate.

Further, in various embodiments, the locking device is locked when the locking engagement block is engaged into the locking groove; and the locking device is unlocked when the locking engagement block is disengaged from the locking groove.

The present invention has the advantages that, by providing a ceramic tile leveling bracket, pushing and clamping pliers and a ceramic tile leveling and laying system, in the ceramic tile laying process, the ceramic tile leveling bracket and the insertion block are used to support the junction between two adjacent ceramic tiles, so that the upper surfaces of multiple ceramic tiles in the same area are kept on the same plane, the operation is simple and convenient, and the laying efficiency and the leveling quality are effectively improved, thereby facilitating large-scale application.

Figure 1:
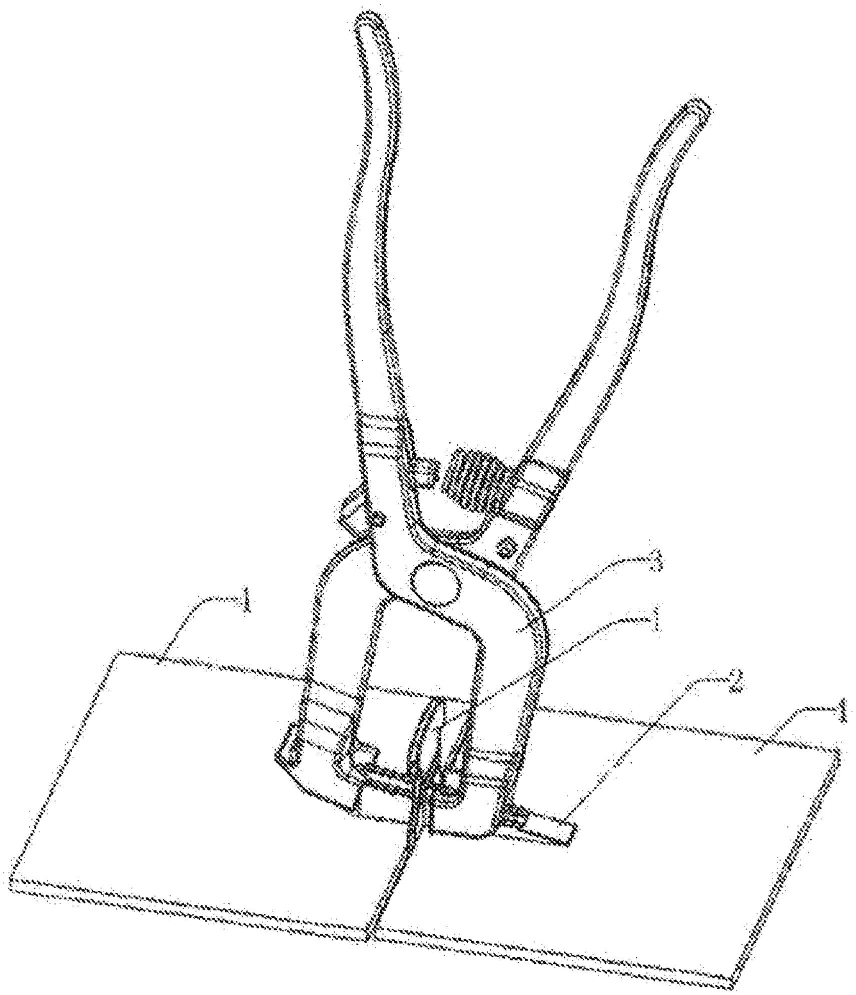
FIG. 1 is a schematic structural view of a ceramic tile leveling and laying system in use according to an embodiment of the present invention.

1 Ceramic tile leveling bracket, 2 Insertion block, 3 Pushing and clamping pliers, 4 Ceramic tile;

11 Pad, 12 Insert, 13 Sheet, 14 Reinforcing rib, 15 Pad through hole, 16 Insertion block through hole;

17 Linear groove, 18 Bayonet, 19 Hook-shaped engagement block, 20 Hook-shaped bayonet portion;

21 Insertion block bottom surface, 22 Insertion block top surface, 23 Serration, 24 Vertical serration surface, 25 Inclined serration surface;

31 First component, 32 Second component, 33 Pivot, 34 Clamping teeth, 35 Withdraw device, 36 Elastic member;

37 Locking device;

311 First clamping portion, 312 First handheld portion, 313 First clamping block, 314 Clamping groove, 315 First bent portion;

321 Second clamping portion, 322 Second handheld portion. 323 Second clamping block, 324 Clamping through groove, 325 Second bent portion;

351 Hook angled portion, 352 Rounded portion, 361 First guiding post, 362 Second guiding post;

371 Locking groove, 372 Locking member, 373 Blocking block;

3721 Locking member body, 3722 Locking engagement block, 3723 Tab, 3724 Second pivot, 3725 Gasket.

DETAILED DESCRIPTION OF EMBODIMENTS

The preferred embodiments of the present invention are described below with reference to the accompanying drawings, and the present invention can be fully introduced to those skilled in the art, such that the technical content thereof will be clearer and is easy to understand. The present invention can be embodied in various forms of embodiments, and the scope of protection of the present invention is not limited to the embodiments mentioned herein.

In the drawings, the same reference numeral indicates components having the same structure, and similar reference numerals indicate assemblies having similar structures or functions throughout. The size and thickness of each assembly shown in the figures are shown arbitrarily, and the present invention does not define the size and thickness of each assembly. In order to make the illustration clearer, the thickness of the component in some places of the figures is appropriately exaggerated.

Orientation terms mentioned in the present invention, such as "upper", "lower", "front", "rear", "left", "right", "inner", "outer", "side" etc., are merely orientations in the figures and are only intended to explain and illustrate the present invention and are not intended to limit the scope of protection of the present invention.

When a certain assembly is described as "on" a further assembly, the assembly can be placed directly on the further assembly; and there may also be an intermediate assembly on which the assembly is placed, and the intermediate assembly placed on the further assembly. When an assembly is described as "mounted to" or "connected to" a further assembly, it can be understood as either "mounted" or "connected" directly, or an assembly being indirectly "mounted to" or "connected to" the further assembly via an intermediate assembly.

As shown in FIG. 1, this embodiment provides a ceramic tile leveling system, comprising a ceramic tile leveling bracket 1, an insertion block 2 and pushing and clamping pliers 3 cooperating with one another for assist in leveling of ceramic tiles 4 in the ceramic tile laying process, such that all the upper surfaces of the ceramic tiles lie on the same plane.

During the construction of the ceramic tile laying, a user can apply an adhesive such as cement, and a ceramic tile adhesive on a floor or a wall according to requirements, and then lay multiple ceramic tiles on the floor or the wall in sequence. During laying, a ceramic tile leveling bracket 1 is placed at the joint of any two adjacent ceramic tiles 4, taking a square ceramic tile as an example, each of four sides thereof needs to be provided with a ceramic tile leveling bracket 1.

Figure 2:
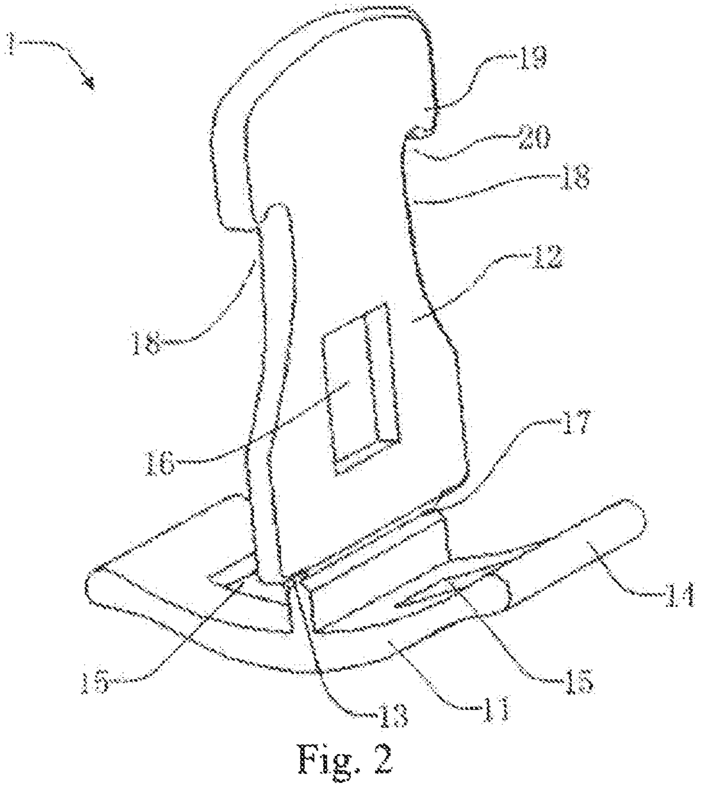
FIG. 2 is a schematic perspective structural view of a ceramic tile leveling bracket according to an embodiment of the present invention.
Figure 3:
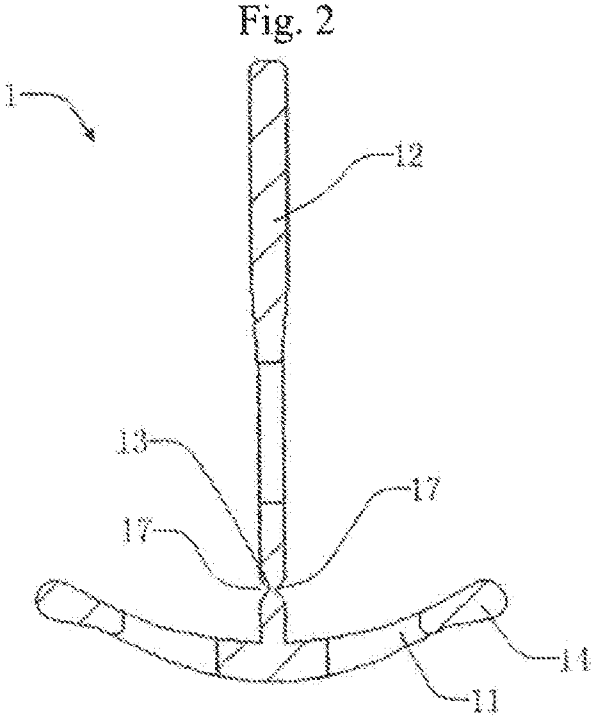
FIG. 3 is a schematic view showing a longitudinal section of a ceramic tile leveling bracket according to an embodiment of the present invention.
Figure 4:
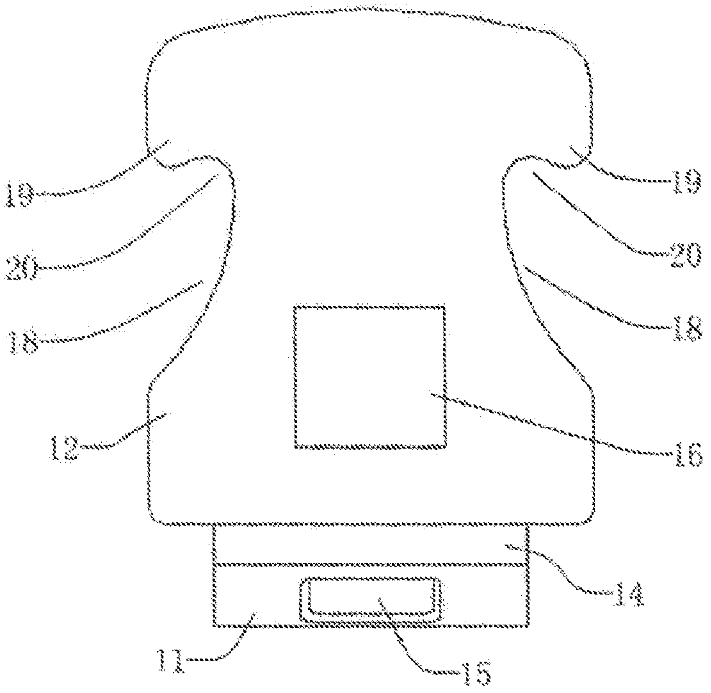
FIG. 4 is a schematic front structural view of a ceramic tile leveling bracket according to an embodiment of the present invention.

As shown in FIGS. 2 to 4, the ceramic tile leveling bracket 1 comprises a pad 11 and an insert 12 which are integrally provided. The insert 12 protrudes from the center line of the upper surface of the pad 11. The longitudinal section of the ceramic tile leveling bracket 1 approximates an inverted T-shape. The pad 11 is disposed below two adjacent ceramic tiles 4, and the insert 12 is inserted into the gap between the two adjacent ceramic tiles 4.

The bottom surface of the pad 11 is an arc-shaped surface which is a part of a cylindrical side surface. To ends of the pad 11 extend smoothly upward from the middle of the bottom surface, and the tops of the two ends of the pad 11 are provided with reinforcing ribs 14 to make contact with and support the bottom surfaces of the two adjacent ceramic tiles 4. The pad 11 is provided with two or more pad through holes 15 which penetrate the pad 11. In the ceramic tile leveling process, an adhesive under the ceramic tile 4 will enter from the pad through holes 15 into the space enclosed by the pad 11 and the lower surfaces of the ceramic tiles 4. During the curing of the adhesive, the pad 11 and the two ceramic tiles 4 are fixed into one body.

Figure 5:
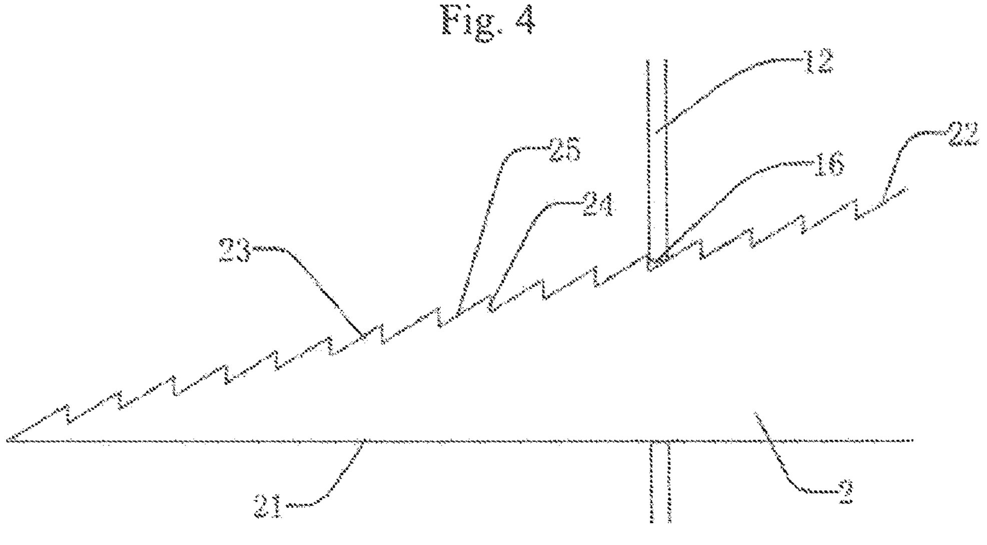
FIG. 5 is a schematic cross-sectional structural view of an insertion block and an insertion block through hole according to an embodiment of the present invention.

As shown in FIGS. 4 and 5, an insertion block through hole 16 is provided in the middle of the insert 12, the insertion block through hole 16 penetrates the insert 12, and an insertion block 2 may be inserted into the insertion block through hole. The longitudinal section of the insertion block 2 is wedge-shaped, which comprises an insertion block bottom surface 21 and an insertion block top surface 22, wherein the insertion block bottom surface 21 is a plane; the insertion block top surface 22 is an inclined plane, and forms an acute angle, preferably of 20 to 30 degrees, with the insertion block bottom surface 21. The insertion block top surface 22 is provided with two or more protruding serrations 23, and the multiple serrations are arranged in the same straight line. Each serration 23 comprises a vertical serration surface 24 and an inclined serration surface 25, the vertical serration surface 24 is perpendicular to the insertion block bottom surface 21, and the inclined angle of the inclined serration surface 25 is consistent with the inclined angle of the insertion block top surface 22.

As shown in FIG. 1, after the ceramic tile leveling bracket 1 is assembled into the gap between the two adjacent ceramic tiles 4, the lower end of the insertion block 2 can be inserted into the insertion block through hole 16, and the cross section of the higher end of the insertion block 2 is semicircular. The user can push the insertion block 2 as far as possible into the insertion block through hole 16 by using the pushing and clamping pliers 3, so that the insert 12 can be engaged into the serration gap between two serrations on the insertion block top surface 22, and the positions of the two ceramic tiles 4 are thus locked. In the process of gradually pushing the insertion block 2 into the insertion block through hole 16, the pad 11 moves in a small range with respect to the ceramic tiles 4, and the ceramic tiles 4 are lifted. The heights of the two ceramic tiles 4 are finely adjusted such that the insertion block bottom surface 21 is tangent to the upper surfaces of the two ceramic tiles 4. At this time, the adhesive under the ceramic tiles 4 is not cured and can flow through the pad through holes 15 into the space enclosed by the pad 11 and the ceramic tiles 4. After the adhesive is cured, the pad 11 and the ceramic tiles 4 are fixed into one body. Since the insertion block bottom surface 21 is a plane, the upper surfaces of the two ceramic tiles 4 must also be in the same plane, so that the leveling process of the two ceramic tiles can be completed.

In this embodiment, the ceramic tile 4 is rectangular or square, and the junctions between the four sides thereof and the other ceramic tiles can be respectively provided with a ceramic tile leveling bracket 1 according to the above method. By analogy, the upper surfaces of all the ceramic tiles laid on the construction site can be positioned on the same plane by multiple ceramic tile leveling brackets 1, and then left to stand for a period of time to cure the adhesive (cement, ceramic tile adhesive, etc.).

As shown in FIGS. 2 and 3, the lower portion of the insert 12 that is close to the pad 11 is provided with a breakable sheet 13, and the sheet 13 is part of the insert 12, and is in the shape of a straight line having a certain width, along which the user can tear the sheet 13 to break same, so that the insert 12 is divided into upper and lower portions from the tear. The height of the sheet 13 is substantially flush with the lower surface of the ceramic tile 4.

The insert 12 further comprises a linear groove 17 recessed from a surface on one or either side of the insert 12, and the bottom of the linear groove 17 is the sheet 13. The groove structure on one side or either side of the sheet 13 makes the thickness of the sheet 13 relatively thin, and its thickness is generally about 1 to 2 mm. This groove structure makes the sheet 13 easy to tear. After the adhesive is cured, the user can violently break or tear the upper portion of the insert 12 from the sheet 13 with a conventional pliers tool.

As shown in FIG. 4, in this embodiment, a side edge of the insert 12 on one side is provided with a bayonet 18, or side edges of the insert 12 on two sides are respectively provided with a bayonet 18, and the height of the bayonet 18 is greater than that of the sheet 13. The insert 12 further comprises a hook-shaped engagement block 19 disposed on a side edge of the insert 11 on one or either side and protruding toward the bayonet 18. The longitudinal section of the bottom of the bayonet 18 is arc-shaped, and a portion of the bayonet 18 that is adjacent to the hook-shaped engagement block 19 forms a hook-shaped bayonet portion 20. The bottom of the bayonet 18 is a contact edge that can cooperate with an outer edge of a hook angled portion 351 of the pushing and clamping pliers 3. The longitudinal section of the bottom of the bayonet 18 is arc-shaped, and the opening end of the arc-shaped contact edge (i.e., the hook-shaped engagement block 19) is bent downwards.

The user can remove the upper part of the insert 12 from the sheet 13 by using a withdraw tool such as a small claw hammer. Specifically, the barb structure of the withdraw tool is used to engage into the bayonet 18 to remove the part of the insert above the sheet 13 using the principle of lever. In this embodiment, a withdraw device is provided in the pushing and clamping pliers 3, and the withdraw device has a hook-shaped bayonet portion 20 which can be engaged into the bayonet 18 to quickly and efficiently remove part of the insert, as will be described in detail below.

In the construction of ceramic tile laying, after the cement, the ceramic tile adhesive or the like is cured, the inserts 12 of all the ceramic tile leveling brackets 1 are broken from the sheets 13, and after the upper half of the insert 12 and the insertion block 2 are removed and cleaned, and all the gaps between the ceramic tiles are filled and flattened, the entire process of ceramic tile laying can be completed, so that the operation is simple, the construction processes can be effectively reduced, and the construction efficiency is improved.

In this embodiment, the pushing and clamping pliers 3 are used to push and clamp the insertion block 2 into the insertion block through hole 16 such that the insertion block bottom surface 21 is tangent to the upper surfaces of the two ceramic tiles 4.

Figure 6:
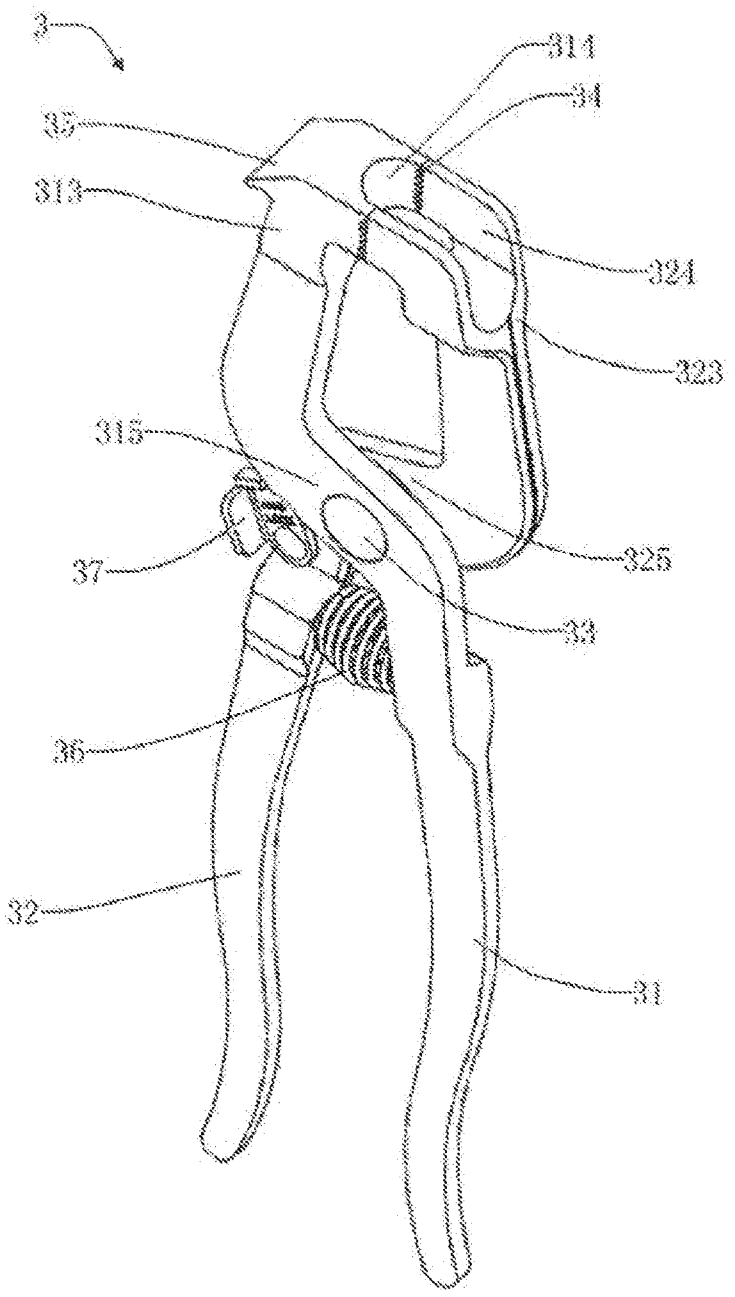
FIG. 6 is a schematic structural view of pushing and clamping pliers according to an embodiment of the present invention.
Figure 7:
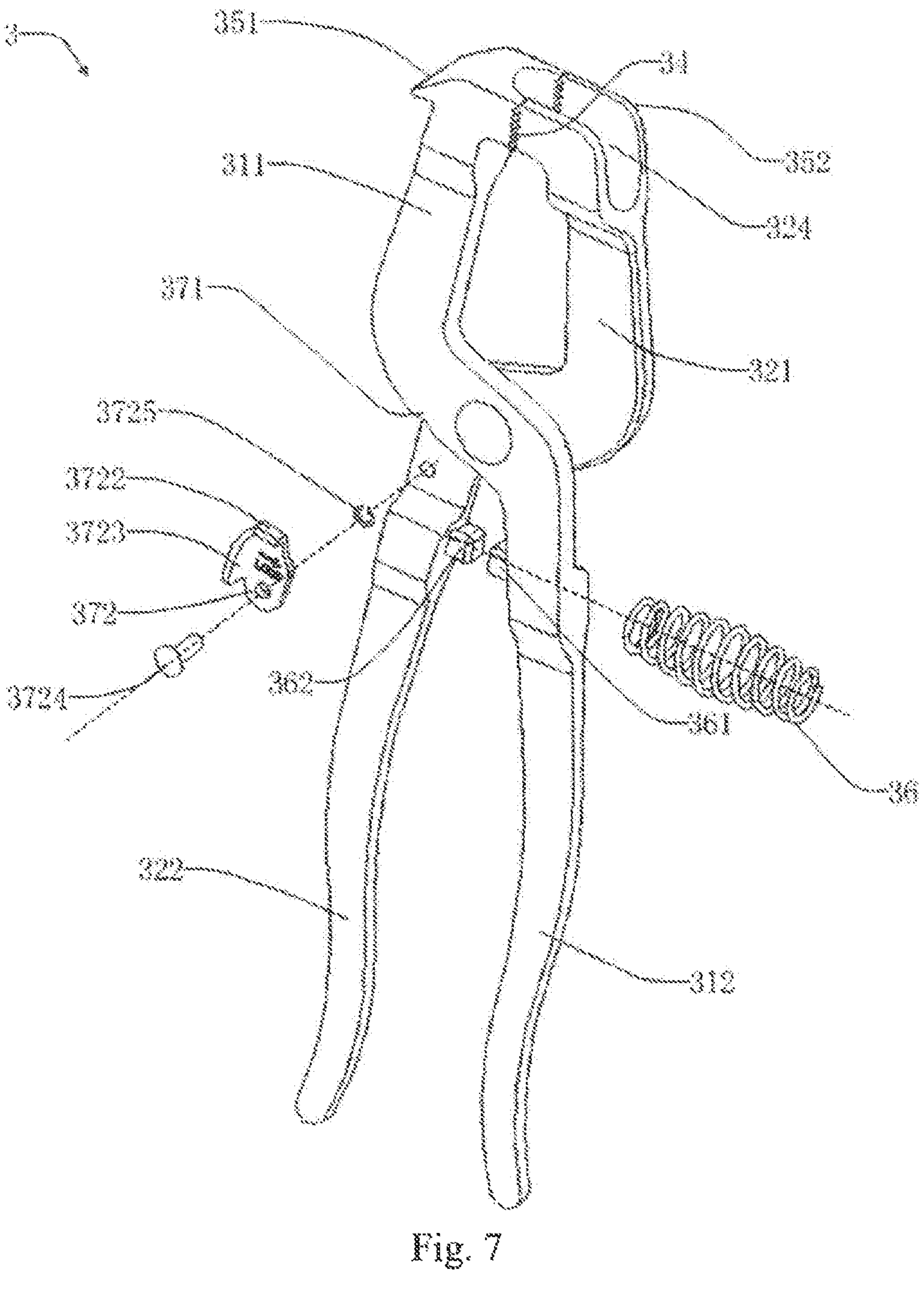
FIG. 7 is a schematic exploded structural view of pushing and clamping pliers according to an embodiment of the present invention.

As shown in FIGS. 6 and 7, the pushing and clamping pliers 3 comprise a first component 31, a second component 32, and a pivot 33. The first component 31 comprises a first clamping portion 311 and a first handheld portion 312; and the second component 32 comprises a second clamping portion 321 and a second handheld portion 322; wherein the second clamping portion 311 is rotatably connected to the first clamping portion 311 via the pivot 33. A first clamping block 313 is disposed at a top end of the first clamping portion 311, and a second clamping block 323 is disposed at a top end of the second clamping portion 321. The second clamping block 323 is at the same height with the first clamping block 313 and disposed opposite same.

The inner side faces of the first clamping block 313 and the second clamping block 323 opposite each other may be provided with clamping teeth 34, wherein the clamping teeth 34 of the first clamping block 313 are disposed opposite the second clamping block 323; and the clamping teeth 34 of the second clamping block 323 are disposed opposite the first clamping block 313. That is to say, the clamping teeth 34 of the first clamping block 313 are opposite the clamping teeth 34 of the second clamping block 323. The inner side faces of the two clamping blocks facing each other are clamping faces, and the clamping teeth 34 can increase the friction coefficient between the clamping faces and the surface of an object to be clamped, to prevent the object from slipping out.

As shown in FIGS. 1, 6 and 7, in this embodiment, the inner side wall of the first clamping block 313 is provided with a recessed clamping groove 314, with the direction of the opening thereof facing the second clamping block 323; and the second clamping block 323 is provided with a clamping through groove 324 transversely penetrating the entire second clamping block 323. The clamping through groove 324 is disposed opposite and is in the same straight line with the clamping groove 314. Portions of the second clamping block 323 on the two sides and at the bottom of the clamping through groove 324 form a bifurcated structure, which comprises two bifurcated portions. The clamping through groove 324 is located between the two bifurcated portions, and the clamping teeth 34 are provided on the clamping faces on the inner sides of the two bifurcated portions.

Figure 9:
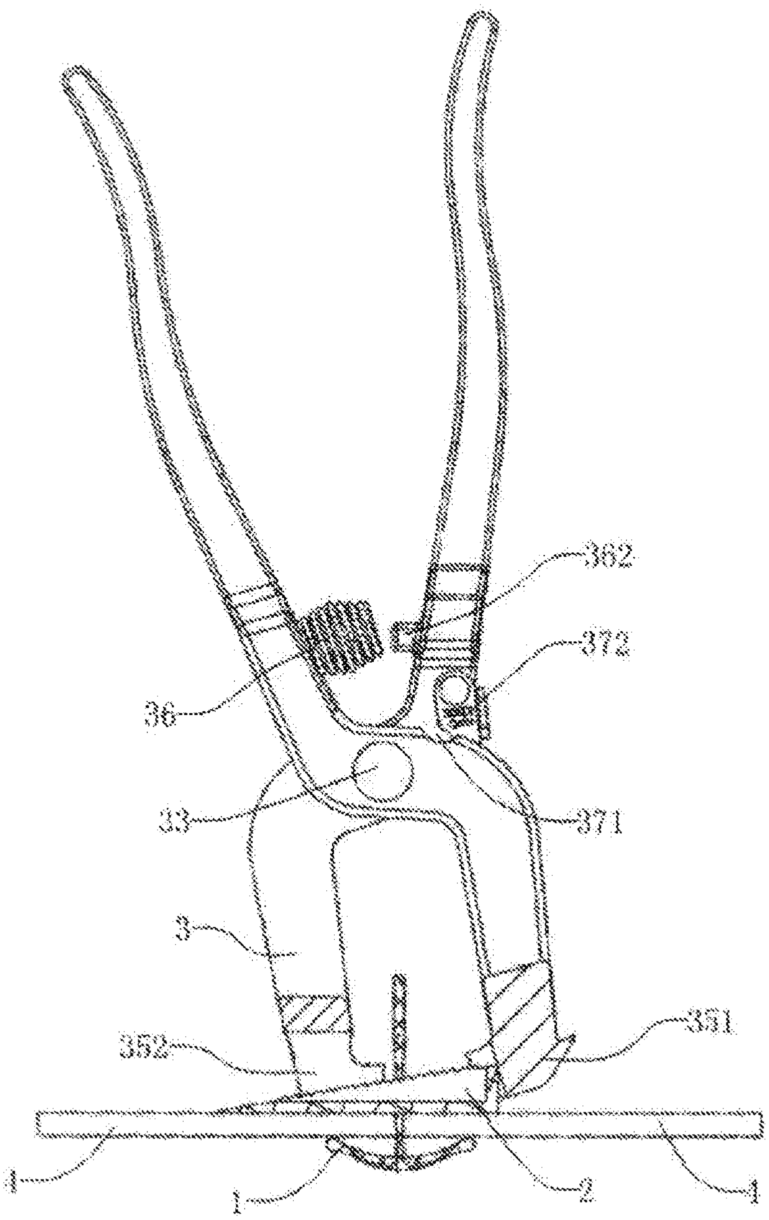
FIG. 9 is a side view of the ceramic tile leveling and laying system in use according to an embodiment of the present invention.

As shown in FIG. 9, the clamping through groove 324 and the clamping groove 314 are used to push the insertion block 2 in the insertion block through hole 16 of the ceramic tile leveling bracket 1. When the lower end of the insertion block 2 is pushed into the insertion block through hole 16, the user puts the pushing and clamping plier 3 upside down and opens same, the higher end of the insertion block 2 is placed in the clamping groove 314, the lower end of the insertion block 2 is placed in the clamping through groove 324, and then the two handheld portions 312, 322 are closed by force. During the closing of the pushing and clamping pliers 3, the first clamping block 313 pushes the higher end of the insertion block 2 into the insertion block through hole 16, and the bifurcated portion of the second clamping block 323 is pushed against one side of the insert 12; the lower end of the insertion block 2 slides through the clamping through groove 324 to secure the insertion block 2 in the insertion block through hole 16, so that the insert 12 can be engaged onto a certain serration on the insertion block top surface 22, thereby locking the positions of the two ceramic tiles 4.

In this embodiment, the pushing and clamping pliers 3 further comprise a withdraw device 35 for damaging the sheet 13 of the ceramic tile leveling bracket 1 to remove the portion of the insert 12 above the sheet 13.

As shown in FIGS. 6 and 7, the withdraw device 35 comprises a hook angled portion 351 and a rounded portion 352. The hook angled portion 351 protrudes in a barb shape from the outer side wall of the first clamping block 313, and the outer edge of the hook angled portion 351 is a smooth plane or an arc-shaped surface, and is disposed on the joint between the side wall and the top of the first clamping block

313. The rounded portion 352 is disposed at the joint between the side wall and the top of the second clamping block 323, and each of the two bifurcated portions has a rounded portion 352. Alternatively, the hook angled portion 351 protrudes in a barb shape from the outer side wall of the second clamping block 323, and the two bifurcated portions protrude outwardly and a hook angled portion 351 extends therefrom, and the outer edge of the hook angled portion 351 is a smooth plane or an arc-shaped surface, and disposed at the joint between a side wall and the top of the second clamping block 323. The rounded portion 352 is provided at the joint between the side wall and the top of the first clamping block 313.

In this embodiment, the side edges of the insert 12 on two sides are respectively provided with a bayonet 18 and a hook-shaped engagement block 19, and the hook-shaped engagement block 19 is disposed at the upper portion of the bayonet 18 and protrudes toward the bayonet 18, and a portion of the bayonet 18 that is adjacent to the hook-shaped engagement block 19 forms a hook-shaped bayonet portion 20. The bottom of the bayonet 18 is a contact edge that can cooperate with an outer edge of a hook angled portion 351 of the pushing and clamping pliers 3. The longitudinal section of the bottom of the bayonet 18 is arc-shaped, and the opening end of the arc-shaped contact edge (i.e., the hook-shaped engagement block 19) is bent downwards.

Figure 10:
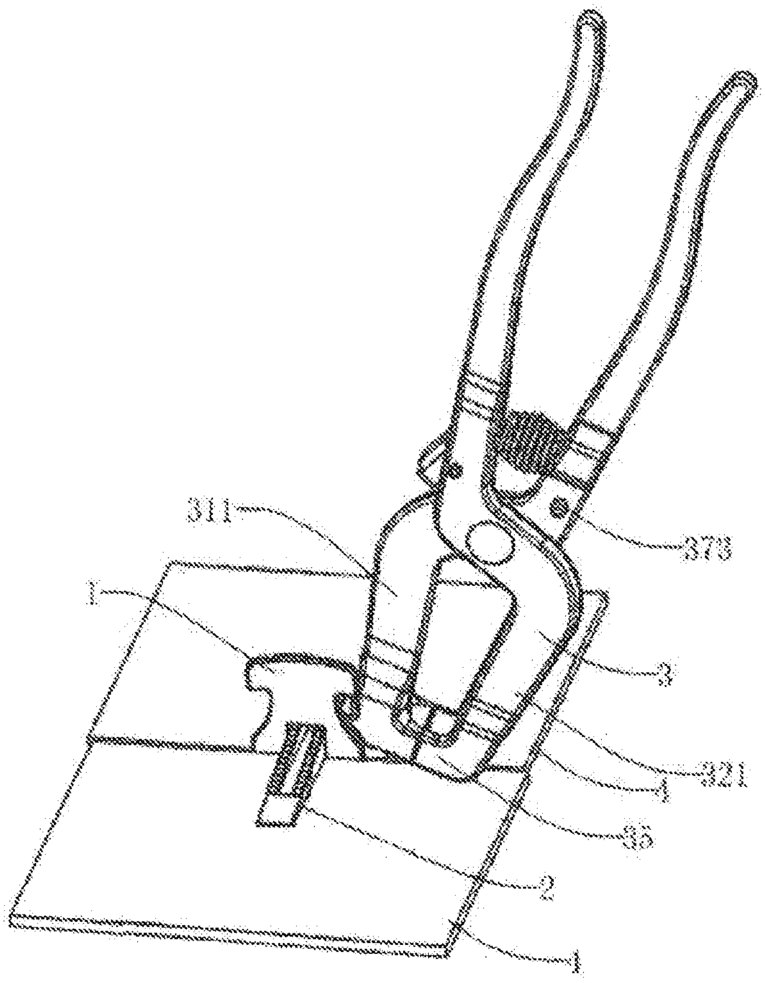
FIG. 10 is a schematic view of the removal of an insert with the pushing and clamping pliers according to an embodiment of the present invention.

In the ceramic tile laying process, after the adhesive is cured, the pad 11 and the ceramic tiles 4 are both fixed by the adhesive, and the user can remove the upper half of the insert 12 by the withdraw device 35 of the pushing and clamping pliers 3. As shown in FIG. 10, at first, the user needs to close and lock the pushing and clamping pliers 3, the hook angled portion 351 of the withdraw device 35 is engaged into the bayonet 18 on the side edge of the insert 12, the outer edge of the hook angled portion 351 slides along the contact edge of the bayonet 18, the hook angled portion 351 is engaged into the hook-shaped bayonet portion 20, and the rounded portion 352 of the withdraw device 35 is placed on the upper surfaces of the ceramic tiles 4. According to the principle of lever, the user can pull the upper half of the insert 12 upward with the rounded portion 352 as the fulcrum, and since the lower portion of the insert 12 that is close to the pad 11 is provided with the breakable sheet 13, when the upper portion of the insert 12 is subjected to an upward force, the sheet 13 is torn or broken, thereby removing the portion of the insert 12 above the sheet 13. If the sheet 13 is only torn but not completely broken after subjected to the force, since the bayonets 18 are provided on two sides of the insert 12, the user can repeat the above operation from the other side until the upper portion of the insert 12 is completely removed.

As shown in FIGS. 6 and 7, in this embodiment, the pushing and clamping pliers 3 further comprise an elastic member 36, one end of which is connected to the first clamping portion 311, and the other end thereof is connected to the second clamping portion 321. Alternatively, one end of the elastic member is connected to the first handheld portion 312, and the other end thereof is connected to the second handheld portion 322. When the first component 31 and the second component 32 of the pushing and clamping pliers 3 are relatively closed, only one hand of the user needs to apply force to the inner side, but when they are relatively opened, the user needs to use two hands at the same time, so the operation is inconvenient. The elastic member 36 mounted between the first component 31 and the second component 32 makes it possible to provide a certain outward tension between the first component 31 and the second component 32, so that the user can enable opened and closed operations with one hand.

Preferably, this embodiment further comprises a first guiding post 361 and a second guiding post 362 respectively disposed on two opposite side faces of the two handheld portions 312, 322. The first guiding post 361 protrudes from the inner side face of the first handheld portion 312. The second guiding post 362 protrudes from the inner side face of the second handheld portion 322, and the second guiding post 362 is disposed opposite the first guiding post 361. The elastic member 36 is preferably a coil spring, one end thereof is sheathed on the first guiding post 361 and the other end thereof is sheathed on the second guiding post 362. In other variant embodiments, the two guiding posts 361, 362 may be respectively disposed on two opposite side faces of the two clamping portions 311, 321, wherein the first guiding post 361 protrudes from the inner side face of the first clamping portion 311; and the second guiding post 362 protrudes from the inner side face of the second clamping portion 321, and the second guiding post 362 is disposed opposite the first guiding post 361.

Figure 8:
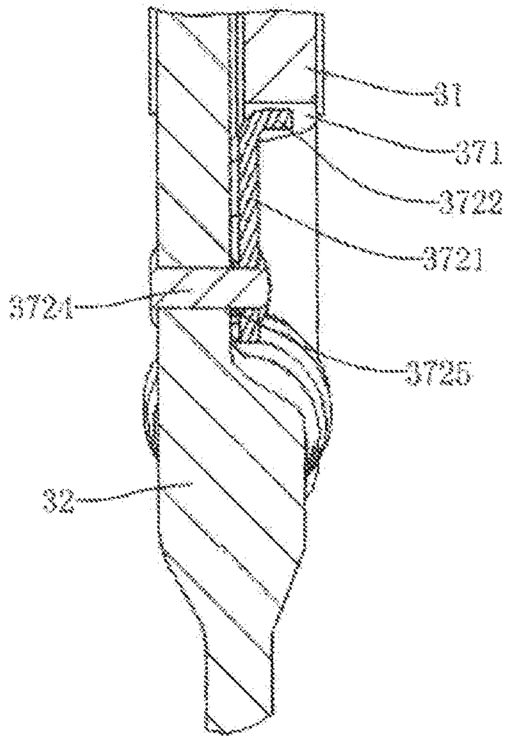
FIG. 8 is a schematic side structural view of a locking device according to an embodiment of the present invention.

As shown in FIGS. 6 to 8, in this embodiment, the pushing and clamping pliers 3 further comprise a locking device 37 for switching the pushing and clamping pliers 37 between opened and closed states, the opened and closed states including a closed state and an opened state. When the locking device 37 is locked, the pushing and clamping pliers 3 are in the closed state. When the locking device 37 is unlocked, the pushing and clamping pliers 3 are in the opened state.

In this embodiment, the pushing and clamping pliers 3 further comprise a first bent portion 315 and a second bent portion 325, which are both sheathed outside the pivot, so that the second component 32 is hinged to the first component 31 via the pivot 33. The first bent portion 315 is part of the first clamping portion 311, and the second bent portion 325 is part of the second clamping portion 321.

As shown in FIGS. 6 to 10, the locking device 37 comprises a locking groove 371, a locking member 372, and a blocking block 373. The locking member 372 and the blocking block 373 are respectively disposed at the ends of the two clamping portions and close to the handheld portions.

In this embodiment, preferably, the locking groove 371 is disposed on the outer side wall of the first bent portion 315, and the locking member 372 is rotatably fitted to the surface of the end of the second clamping portion 321 and disposed opposite the locking groove 371. The blocking block 373 is disposed on the surface of the end of the first clamping portion 311 and disposed opposite the second bent portion 325. When the opening angle of the pushing and clamping pliers is at the maximum, the blocking block 373 comes into contact with the outer side wall of the second bent portion 325.

As shown in FIG. 8, the locking member 372 comprises a locking member body 3721, a locking engagement block 3722, and a tab 3723. The locking member body 3721 may be a metal sheet, which is rotatably connected to the end of the first clamping portion 311 or the second clamping portion 321 via a second pivot 3724. A gasket 3725 is disposed between the locking member 372 and the first clamping portion 311 or the second clamping portion 321. The locking member 372 and the clamping portion 311, 321 are both made of metal, and the gasket 3725 can assist in the relative rotation of the two, thereby reducing wear between the components. The locking engagement block 3722 protrudes from the front end of the surface of the locking member body 3721. When the locking engagement block 3722 is engaged into the locking groove 371, the locking device 37 is locked. When the locking engagement block 3722 is disengaged from the locking groove 371, the locking device 37 is unlocked. The tab 3723 protrudes from and is perpendicular to the surface of the locking member body 3721. The user can use the finger to move the tab 3723 to drive the locking member body 3721 to rotate, so that the locking engagement block 3722 is engaged into or disengaged from the locking groove 371.

When the pushing and clamping pliers 3 need to be adjusted from the closed state to the opened state, the user can first further close the two handheld portions, and then rotate the tab 3723 counterclockwise, so that the locking engagement block 3722 is disengaged from the locking groove 371, and is therefore unlocked, and the two clamping portions are opened under the act of the elastic member 36 (coil spring).

When the pushing and clamping pliers 3 need to be adjusted from the opened state to the closed state, the user can first close the two handheld portions, and then rotate the tab 3723 clockwise, so that the locking engagement block 3722 is engaged into the locking groove 371, and the two clamping portions are therefore locked in the closed state.

Similarly, the locking groove 371 may also be disposed on the outer side wall of the second bent portion 325, and the locking member 372 is rotatably fitted to the surface of the end of the first clamping portion 311 and disposed opposite the locking groove 371. The blocking block 373 is disposed on the surface of the end of the second clamping portion 321 and disposed opposite the first bent portion 315. When the opening angle of the pushing and clamping pliers is at the maximum, the blocking block 373 comes into contact with the outer side wall of the second bent portion 315.

This embodiment provides a ceramic tile leveling bracket, pushing and clamping pliers and a ceramic tile leveling and laying system, in the ceramic tile laying process, the ceramic tile leveling bracket and the insertion block are used to support the junction between two adjacent ceramic tiles, so that the upper surfaces of multiple ceramic tiles in the same area are kept on the same plane, the operation is simple and convenient, and the laying efficiency and the leveling quality are effectively improved, thereby facilitating large-scale application.

The above description is only preferred embodiments of the present invention, and a person of ordinary skill in the art can also make some improvements and refinements to the above technical solutions without departing from the principles of the present invention, and these improvements and refinements should also be considered to be within the scope of protection of the present invention.

The invention claimed is:

1. A ceramic tile leveling and laying system comprising:
- a ceramic tile leveling bracket, which is provided at a junction between two adjacent ceramic tiles;
- an insertion block having one end inserted into the ceramic tile leveling bracket; and
- pushing and clamping pliers, being configured to push the insertion block into the ceramic tile leveling bracket so that the insertion block is clamped to the ceramic tile leveling bracket;
- wherein the ceramic tile leveling bracket comprises:
  - a pad for supporting bottom surfaces of the two adjacent ceramic tiles;
  - an insert protruding from an upper surface of the pad, for being inserted into a gap between the two adjacent ceramic tiles; and
  - a breakable sheet located at a lower portion of the insert and adjacent to the pad;
  - wherein the insert comprises:
    - a hole which penetrates the insert and into which the insertion block is inserted;
    - a bayonet disposed on a side edge of the insert on one or either side, and the bayonet having a height from the pad which is greater than a height of the sheet from the pad; wherein the bayonet is configured to be engaged by a withdraw tool to remove an upper part of the insert; and
    - a hook-shaped engagement block disposed on a side edge of the insert on one or either side and the hook-shaped engagement block protruding toward the bayonet;
    - wherein a bottom of the bayonet is arc-shaped, and a portion of the bayonet that is close to the hook-shaped engagement block forms a hook-shaped bayonet portion;
- wherein the pushing and clamping pliers comprises:
  - a first component, comprising a first clamping portion and a first handheld portion;
  - a second component, comprising a second clamping portion and a second handheld portion; and
  - a pivot via which the second clamping portion that is rotatably connected to the first clamping portion;
  - characterized by further comprising:
    - a first clamping block disposed at a top end of the first clamping portion,
    - a second clamping block disposed at a top end of the second clamping portion and arranged opposite the first clamping block;
    - a clamping groove recessed from an inner side wall of the first clamping block, with a direction of an opening of the groove facing the second clamping block; and
    - a clamping-through groove penetrating through the second clamping block and disposed opposite the clamping groove;
    - wherein the clamping-through groove is aligned with the clamping groove in an opening and closing direction of the pushing and clamping pliers when the pushing and clamping pliers are closed.

2. The ceramic tile leveling and laying system of claim 1, wherein the insert further comprises:
- a linear groove recessed from a surface of the insert on one or either side, a bottom of the linear groove being the sheet.

3. The ceramic tile leveling and laying system of claim 1, wherein a bottom surface of the pad is an arc-shaped surface, which is part of a cylindrical side surface; and
- two ends of the pad extend upward from a middle of the bottom surface to make contact with the bottom surfaces of the ceramic tiles.

4. The ceramic tile leveling and laying system of claim 3, wherein the pad comprises:
- the two ends of the pad are provided to a reinforcing rib respectively, which is used to make contact with and support the bottom surfaces of the ceramic tiles.

5. The ceramic tile leveling and laying system of claim 1, wherein the pad comprises at least one pad through hole which penetrates the pad along a thickness direction of the pad.

6. The ceramic tile leveling and laying system of claim 1, wherein a longitudinal section of the insertion block is wedge-shaped, wherein a lower end of the insertion block is configured to insert into the ceramic tile leveling bracket, and a higher end of the insertion block is configured to match with the pushing and clamping pliers, so that the pushing and clamping pliers can push and clamp the insertion block to the ceramic tile leveling bracket.

7. The ceramic tile leveling and laying system of claim 6, wherein the insertion block comprises:

an insertion block bottom surface, which is a plane;

an insertion block top surface, which is an inclined plane and forms an acute angle with the insertion block bottom surface.

8. The ceramic tile leveling and laying system of claim 7, wherein the insertion block further comprises two or more serrations protruding from the insertion block top surface.

9. The ceramic tile leveling and laying system of claim 8, wherein the two or more serrations are arranged in the same straight line.

10. The ceramic tile leveling and laying system of claim 8, wherein each of the two or more serrations comprises a vertical serration surface and an inclined serration surface, and the vertical serration surface is perpendicular to the insertion block bottom surface.

11. The ceramic tile leveling and laying system of claim 1, wherein the pushing and clamping pliers further comprises:

a withdraw device for damaging the sheet of the ceramic tile leveling bracket to remove the portion of the insert above the sheet.

12. The ceramic tile leveling and laying system of claim 11, wherein the withdraw device comprises:

a hook angled portion protruding in a barb shape from an outer side wall of the first clamping block; and a rounded portion disposed at a joint between a side wall and the top of the second clamping block; or the withdraw device comprises:

a hook angled portion protruding in a barb shape from an outer side wall of the second clamping block; and a rounded portion disposed at a joint between a side wall and the top of the first clamping block;

wherein the withdraw device is configured such that: the hook angled portion is engaged into the ceramic tile leveling bracket and the rounded portion is in contact with a surface of a ceramic tile as a fulcrum.

13. The ceramic tile leveling and laying system of claim 1, wherein the pushing and clamping pliers further comprising:

an elastic member having one end connected to the first clamping portion and another end connected to the second clamping portion.

14. The ceramic tile leveling and laying system of claim 1, wherein the pushing and clamping pliers further comprising:

a locking device for switching the pushing and clamping pliers between opened and closed states, wherein when the locking device is locked, the pushing and clamping pliers are in the closed state; and when the locking device is unlocked, the pushing and clamping pliers are in the opened state.

15. The ceramic tile leveling and laying system of claim 14, wherein the pushing and clamping pliers further comprising:

a first bent portion, which is part of the first clamping portion and is sheathed outside the pivot; and a second bent portion, which is part of the second clamping portion and is sheathed outside the pivot.

16. The ceramic tile leveling and laying system of claim 15, wherein the locking device comprises:

a locking groove disposed on an outer side wall of the first bent portion;

a locking member rotatably fitted to a surface of the end of the second clamping portion and disposed opposite the locking groove; and a blocking block disposed on a surface of the end of the first clamping portion and disposed opposite the second bent portion, wherein the blocking block comes into contact with an outer side wall of the second bent portion when an opening angle of the pushing and clamping pliers is at a maximum.

17. The ceramic tile leveling and laying system of claim 16, wherein the locking member comprises:

a locking member body rotatably connected to the end of the second clamping portion via a second pivot;

a locking engagement block protruding from a surface of the locking member body; and a tab protruding from the surface of the locking member body to drive the locking member body to rotate.

* * * * *